United States Patent [19]

Kramer et al.

[11] Patent Number: 4,782,522
[45] Date of Patent: Nov. 1, 1988

[54] TERMINAL FOR A TELECOMMUNICATIONS SWITCHING SYSTEM HAVING AN ADDITIONAL KEYBOARD AND/OR VISUAL DISPLAY

[75] Inventors: Dieter Kramer, Idstein; Gerhard Sussner, Meerholz; Wolfgang Girscher; Karl-Heinz Niederhofer, both of Frankfurt; Werner Beck, Damstadt; Bernd Ogorczyk, Karben, all of Fed. Rep. of Germany

[73] Assignee: Telenorma Telefonbau und Normalzeit GmbH, Fed. Rep. of Germany

[21] Appl. No.: 6,943

[22] Filed: Jan. 23, 1987

[30] Foreign Application Priority Data

Jan. 25, 1986 [DE] Fed. Rep. of Germany ....... 3602271
Mar. 8, 1986 [DE] Fed. Rep. of Germany ....... 3607728

[51] Int. Cl.⁴ ............................................ H04M 1/23
[52] U.S. Cl. ..................... 379/368; 379/419; 379/428; 379/354; 340/365 VL
[58] Field of Search ............... 379/110, 419, 428, 429, 379/440, 319, 368, 354; 340/700, 712, 755, 365 R, 365 VL

[56] References Cited

U.S. PATENT DOCUMENTS 4,533,791  8/1985  Read et al. ...................... 379/110 X

FOREIGN PATENT DOCUMENTS 2406881  8/1974  Fed. Rep. of Germany .
3323858  1/1985  Fed. Rep. of Germany .
0127203 10/1979  Japan ................................... 379/419

OTHER PUBLICATIONS

Cermetek Electronics, "A New Generation of Information Terminals", brochure, Apr. 1987.
Adkins et al., "Displayphone: Telephone and Terminal Combine in a Compact Desk-Top Unit", Telesis, 1982 Four, pp. 2-7.
"Displayphone in a Market Trial", Telesis, vol. 9, No. 3, 1982, p. 31.

*Primary Examiner*—James L. Dwyer
*Attorney, Agent, or Firm*—Steele, Gould & Fried

[57] ABSTRACT

A terminal of a telephone switchboard installation with one dialing and one service and/or input keyboard and one or more indicator device(s) and a cradle for the hand set. The terminal includes, on the upper side of the terminal a sliding part, which is formed by the upper side which accommodates the keyboards and sometimes includes an indicator device. In one position, the sliding part operationalizes an additional keyboard or indicator device which is located beneath it. This additional keyboard may be designed as a targeted dialing key set, an alpha-numerical input keyboard, etc., and in addition, the keyboard may be replaced with a bank of lamps indicating lines in use.

9 Claims, 5 Drawing Sheets

TERMINAL FOR A TELECOMMUNICATIONS SWITCHING SYSTEM HAVING AN ADDITIONAL KEYBOARD AND/OR VISUAL DISPLAY

BACKGROUND

The invention concerns terminal equipment for a telephone switchboard installation with one dialing and one service and/or input keyboard and one or several indicator devices and one cradle for the hand set located on the upper side of the terminal.

Such terminal equipment is already generally known. Thus, German Disclosure Document DE-OS No. 34 06 881 describes a device for entering letters, digits, and special characters for an indicator in the telephone. On the upper side of the indicators, keys for a dialing key set are disposed. The upper side of the equipment also contains an indicator device for indication of a telephone number, information on fees, etc.

If a telephone instrument of this nature is provided with additional functions, additional indicator devices and keys, e.g., an input keyboard, may be required. An additional indicator device or additional keys makes it necessary to either enlarge the upper side to accommodate these or to design the keys as miniature keys, as described in the DE-OS No. 34 06 881 cited above.

A wireless telephone is already known from German Disclosure Document DE-OS No. 33 23 858, in which the housing accommodating the listening and the speaking shells consists of housing parts that can be adjusted in relation to one another. The telephone is not operative when pushed together, since the shells for listening and speaking do not have the necessary distance from one another. For this purpose, the two housing parts are pulled apart, whereby the dialing keys are made available, which are covered in the pushed-together position.

OBJECTS AND SUMMARY OF THE INVENTION

The purpose of the invention is to indicate a terminal for a telephone switchboard installation, in which an additional indicator or additional keys may be provided whereby the latter need not be designed as miniature keys and no enlargement of the upper side of the terminal is required for accommodating these additions.

This problem is solved with a terminal having an upper side which accommodates the keyboards, or a part thereof, and possibly an indicator device. The upper side is designed as a sliding part which, in one position, overlays a lower keyboard and/or indicator device and in a second position uncovers such keyboard or indicators.

By moving the sliding part, the additional keys or additional indicator devices are accessible. Therefore, no additional space is required on the upper side of the terminal. It is particularly advantageous if the keys or the indicator device, accessible by moving the sliding part, are not constantly needed. Thus, below the sliding part, one may accommodate the keyboard of a destination dialing device or an alpha-numerical input keyboard, or a field of lamps indicating lines in use.

A further development of the invention includes a switch or a light barrier, which is activated when the sliding part is open (or closed), which in turn activates means for altering the function of the keys and/or indicator devices.

Thereby, it is possible to, e.g., change the functions of the keys accommodated on the upper side to the keys disposed below the sliding part, whereby new functions can be assigned to the freed keys, which functions may be indicated by the indicator device accommodated on the upper side.

Additional advantages are revealed hereinafter.

BRIEF DESCRIPTION OF THE DRAWINGS

The invention is explained in greater detail with reference to an example which is represented in the drawings. The drawings show the following.

DETAILED DESCRIPTION OF THE PREFERRED EMBODIMENTS

Figure 1:
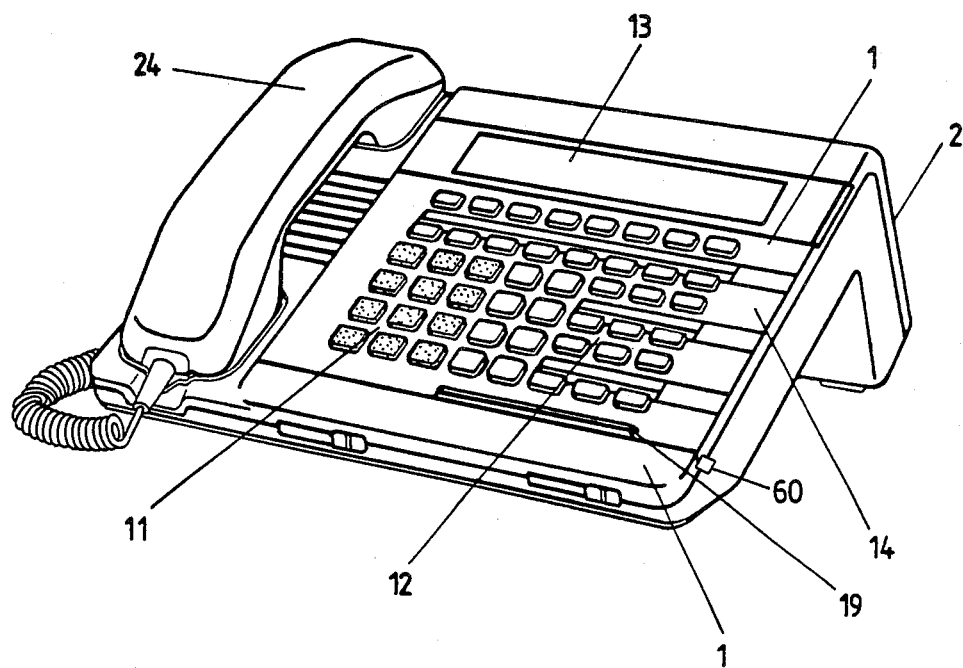
FIG. 1 is a perspective view of a terminal with the sliding part in its idle or closed position.

The upper side, which faces the operator, is provided with a dialing key set 11, a service key set 12, and an indicator device 13, and furthermore, a cradle for the hand set 24. That part of the upper side 1 which accommodates the dialing key set 11, the service key set 12, and the indicator device 13 is designed as a sliding part 14, which can be slidably moved laterally or longitudinally. The grip bar 19 serves movement in a longitudinal direction parallel to hand set 24. The sliding part may be designed so that this includes part of the rear side 2.

Figure 2:
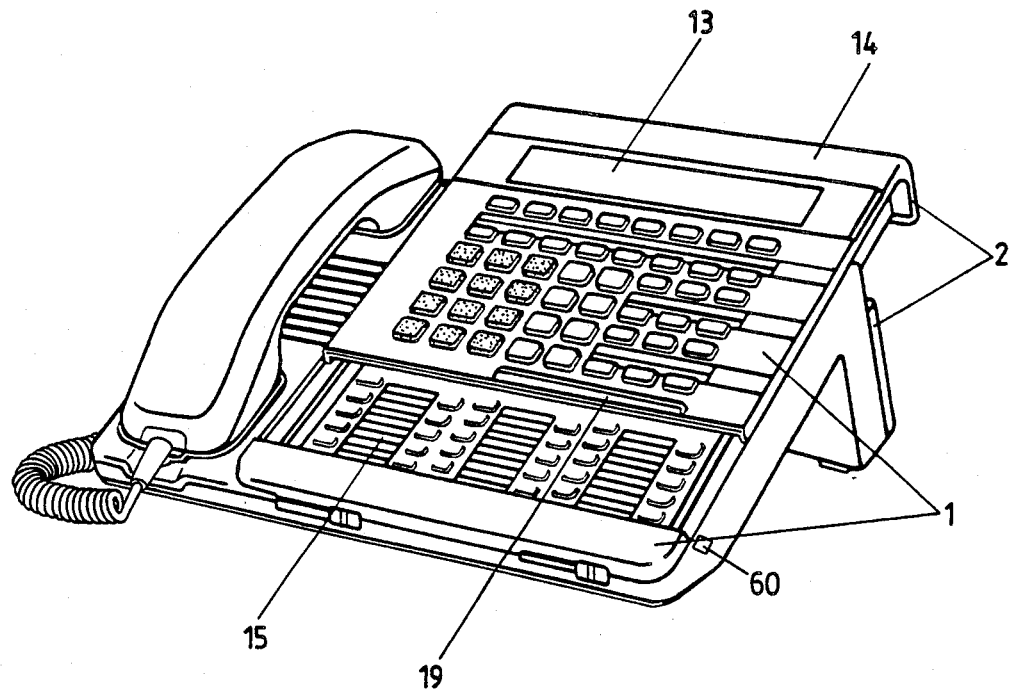
FIG. 2 is a perspective view of the terminal with the sliding part in the operative or open position.

In FIG. 2, the sliding part 14 is shown in that position which makes the keyboard 15 fully accessible. Thereby, the sliding part 14 forms part of the upper side 1 and part of the rear side 2. The keyboard 15, which is made fully accessible by means of the sliding part, may be a dialing key set or an alphanumerical input keyboard. Furthermore, instead of the keyboard 15, an additional indicator device, e.g., a bank of lamps showing lines in use or a liquid crystal indicator may be provided. The movement of the sliding part 14 is achieved by means of the grip bar 19. The sliding part 14 engages in both positions and activates a switch or a light sensor (i.e., a sensor that is activated by the presence or absence of an optical barrier, shown diagrammatically as unit 62) serving, e.g., to switch over the functions of the keys on the upper side 1 to keys on the keyboard 15, whereby the freed keys on the upper side can be assigned to other functions for the duration of the repositioning of the sliding part 14, whereby their new function can be indicated by means of the indicator device 13. If an additional indicator device is provided instead of the operative keyboard 15, it is possible, in the same manner, to switch the indicator functions of the indicator device 13 to the indicator device below the sliding part 14, depending on the position of the sliding part 14.

Figure 3:
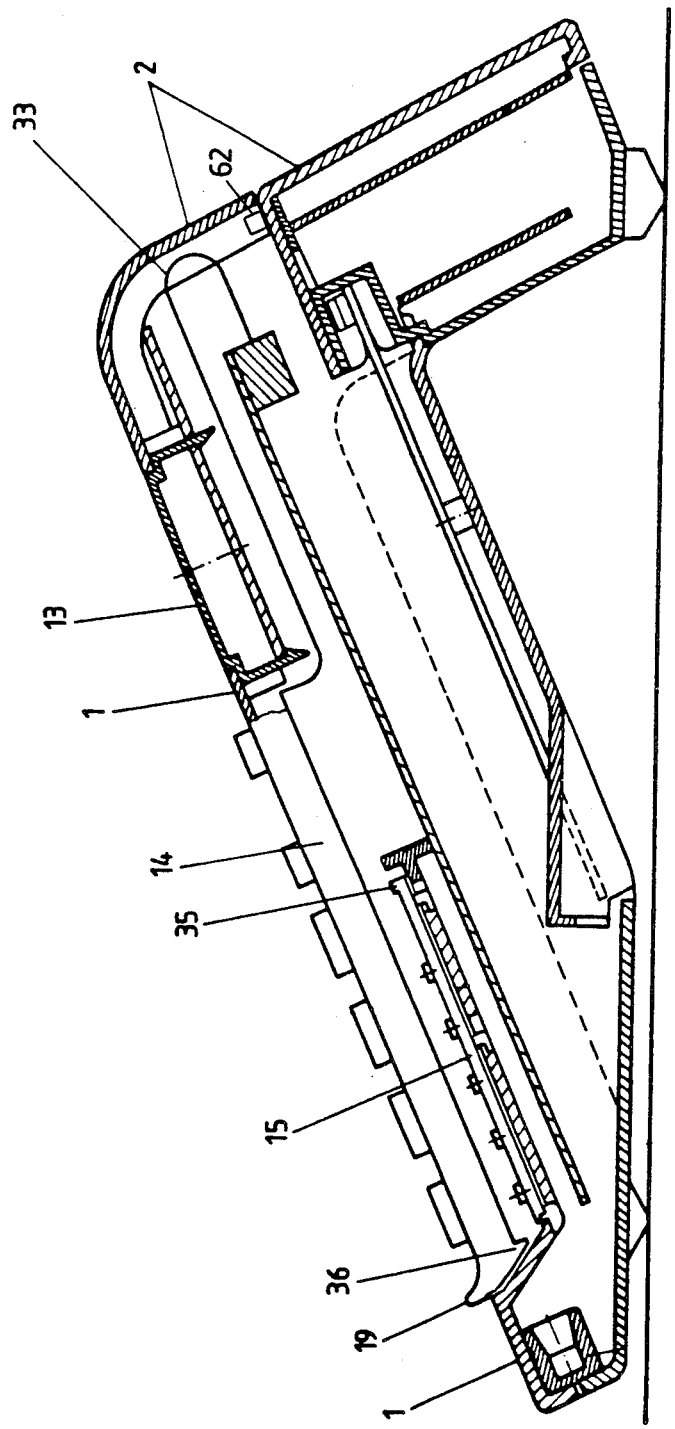
FIG. 3 is a section through the terminal with the sliding part in the idle (closed) position.
Figure 4:
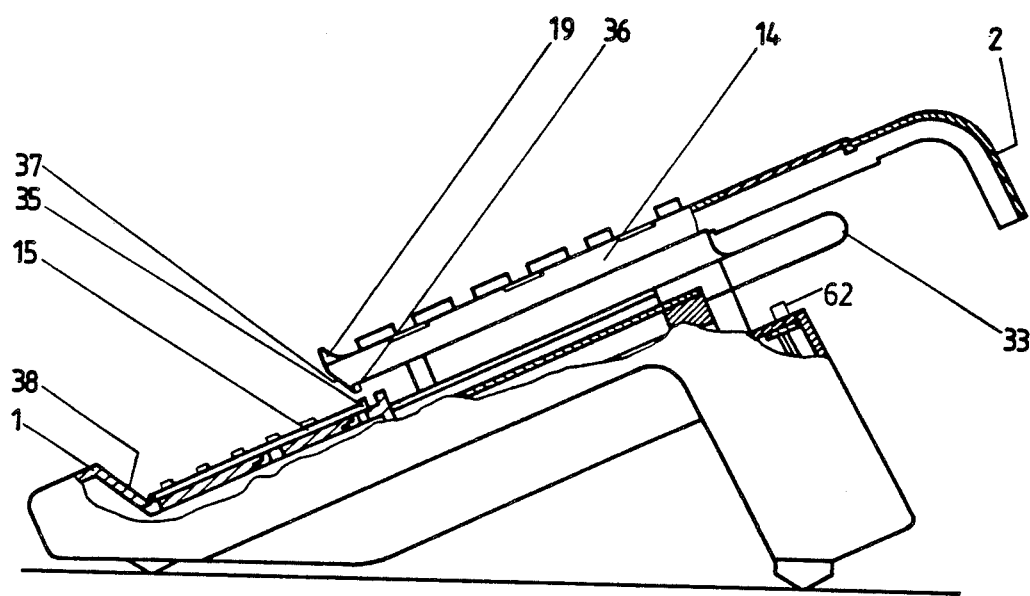
FIG. 4 is a section through the terminal with the sliding part in the operative (open) position.

FIGS. 3 and 4, respectively, show the sliding part in one and in the other position. Below the grip bar 19 of the sliding part 14, a transversal bar 36 is provided on the base of the terminal. The sliding part 14, in the operative mode, i.e., closed position, is flush with the transversal bar 35 of the keyboard 15. The front side of the sliding part 14 between the grip bar 19 and the transversal bar 36 has a chamfer 37 (FIG. 4), complementary to the shape of the housing between the upper side 1 and the keyboard 15 by means of a chamfer 38.

The electrical connection of the devices of the sliding part (keyboard and indicator device) with the other devices of the terminal is achieved via the flexible printed circuit board or the flat cable 33. If the keyboard of the sliding part 14 is designed as a foil type, touch sensitive keyboard, the flexible printed circuit board 33 may constitute part of this foil circuit with the related conductive paths. The sliding part 14 is held in the operative position by means of a locking device 60, which is shown in FIG. 1.

Figure 5:
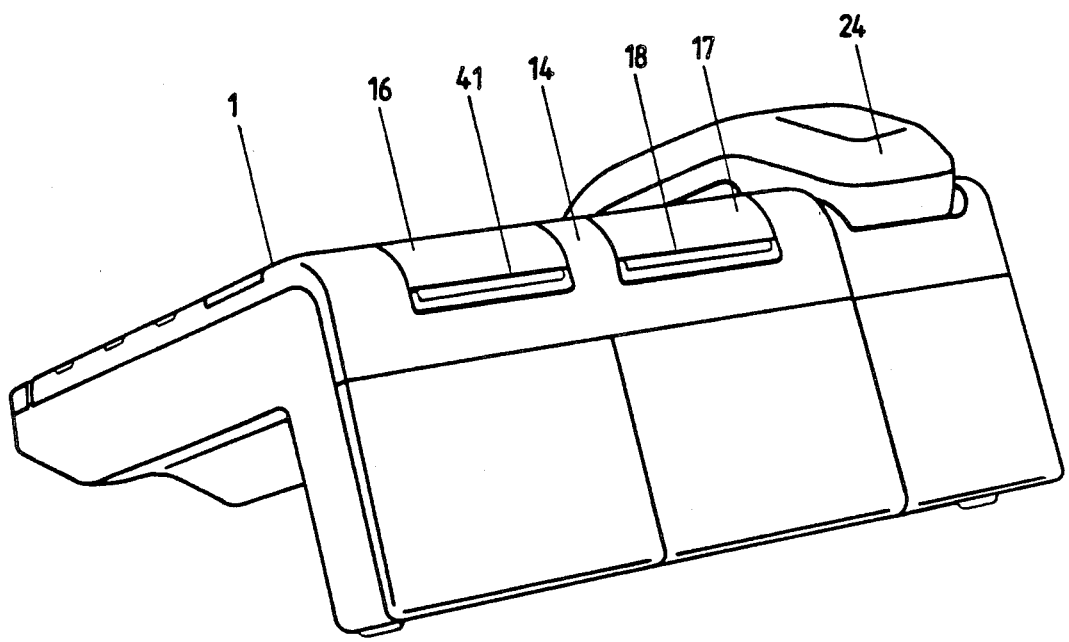
FIG. 5 is a perspective view of the terminal from the rear, with the sliding part in the idle (closed) position.

In the rear view shown in FIG. 5, it is apparent that the sliding part 14 includes part of the rear side of the housing. A diagrammatically illustrated badge reader 16 and a printer 17 may be built into the sliding part 14, the input slot 41 and output slot 18 of which, respectively, run parallel to the upper side 1.

It is emphasized that the invention is not only applicable to a terminal as shown in the drawings but rather, the invention can be applied for all terminals of telephone switchboard installations which may be designed as "comfort telephones", multifunction terminals, switchboards, etc.

What is claimed is:

1. A telecommunications terminal having a base with an upper side, a telephone handset rest on the base and an operator facing panel mounted on the base, the panel having at least one of: a dialing and an operating keyboard; and, a data input keyboard, as well as at least one visual display, the terminal comprising:
   at least one of an additional keyboard and an additional visual display disposed on said base, under said panel; and,
   at least a portion of said panel defining a sliding carriage and carrying said at least one panel keyboard, said carriage being movable between a closed position, overlying said at least one of said additional keyboard and said additional visual display, and an open position, projecting outwardly from said terminal in a space exterior of said terminal cantilevering said terminal, and exposing said at least one of said additional keyboard and said additional visual display to enable utilization thereof.

2. The terminal of claim 1, wherein said additional keyboard is a destination dialing keyboard having at least one of a numeric input and an aphanumerical input keyboard; and, said additional visual display is at least one of: a bank of lamps indicating lines in use; and, a multi-line aphanumerical indicator device.

3. The terminal of claim 1, further comprising means for engaging and locking said sliding carriage into said closed position.

4. The terminal of claim 1, wherein said telephone handset rest defines a longitudinal axis and said sliding carriage moves in a direction parallel to said longitudinal axis.

5. A telecommunications terminal having a base with an upper side, a telephone handset rest on the base and an operator facing panel mounted on the base, the panel having at least one of: a dialing and an operating keyboard; and, a data input keyboard, as well as at least one visual display, the terminal comprising:
   at least one of an additional keyboard and an additional visual display disposed on said base, under said panel;
   at least a portion of said panel defining a sliding carriage and carrying said at least one panel keyboard, said carriage being movable between a closed position, overlying said at least one of said additional keyboard and said additional visual display to enable utilization thereof;
   at least one of a switch and a light sensor for detecting when said sliding carriage is in said closed position; and,
   means for altering an operational function of at least one of said operating keyboards and said visual displays responsive to detection of said closed position by said at least one of said switch and said light sensor.

6. The terminal of claim 5, further comprising:
   flexible connection means for electrically connecting said at least one keyboard on said sliding carriage to said base; and,
   wherein said at least one keyboard on said sliding carriage is at least one of a foil type keyboard and a touch sensitive keyboard.

7. A telecommunications terminal having a base with an upper side, a telephone handset rest on the base and an operator facing panel mounted on the base, the panel having at least one of: a dialing and an operating keyboard; and, a data input keyboard, as well as at least one visual display, the terminal comprising:
   at least one of an additional keyboard and an additional visual display disposed on said base, under said panel;
   at least a portion of said panel defining a sliding carriage and carrying said at least one panel keyboard, said carriage being movable between a closed position, overlying said at least one of said additional keyboard and said additional visual display, and an open position, exposing said at least one of said additional keyboard and said additional visual display to enable utilization thereof; and,
   said terminal having a rear wall, said rear wall having a lower portion formed by part of said base and an upper portion formed by part of said sliding carriage.

8. The terminal of claim 7, further comprising:
   a badge reader means disposed on said sliding carriage; and,
   said sliding carriage having a reader input slot disposed in said upper portion of said rear wall, parallel to said operator facing side of said panel.

9. The terminal of claim 7, further comprising:
   a printer means disposed on said sliding carriage; and,
   said sliding carriage having a printer output slot disposed in said upper portion of said rear wall, parallel to said operator facing side of said panel.

* * * * *